United States Patent [19]
Edmond

[11] 3,893,217
[45] July 8, 1975

[54] SYSTEM AND METHOD FOR AUTOMATIC INSERTION OF PINS IN HOLES

[75] Inventor: James J. Edmond, Southfield, Mich.

[73] Assignee: The Bendix Corporation, Southfield, Mich.

[22] Filed: Dec. 13, 1974

[21] Appl. No.: 532,531

[52] U.S. Cl. .................. 29/407; 29/200 P; 29/203 P; 29/208 C
[51] Int. Cl. ............................................. B23q 17/00
[58] Field of Search ... 29/407, 200 P, 208 C, 203 P, 29/203 B, 208 R

[56] References Cited
UNITED STATES PATENTS

| | | | |
|---|---|---|---|
| 3,581,375 | 6/1971 | Rottmann | 29/407 |
| 3,824,674 | 7/1974 | Inoyama | 29/407 |

FOREIGN PATENTS OR APPLICATIONS

| | | | |
|---|---|---|---|
| 248,476 | 7/1969 | U.S.S.R. | 29/200 P |

*Primary Examiner*—Richard J. Herbst
*Assistant Examiner*—Victor A. DiPalma
*Attorney, Agent, or Firm*—John R. Benefiel

[57] ABSTRACT

A system and method are disclosed which provide a means for automatically inserting a pin into a tightly fitting hole, the system including a pin holder which supports the pin at one end in either a latched condition in which the pin is fixed relative the holder or in an unlatched condition, in which the pin is allowed to freely pivot about its supported end. The pin holder is positioned with respect to the member having the hole formed therein by means of a positioner device which guides the same to the approximate hole location and to advance the pin at least partially into the hole. IF the pin and hole are not aligned the pin is "steered" into the correct lateral position by detection and nulling of the reaction forces created by interaction of a pin and/or hole chamfer. If, after having its lateral position so corrected the pin does not completely enter the hole, its axes are not angularly aligned, and a binding condition between the pin and the hole has occurred created by the relative tilt of the pin axis with respect to the hole axis. This condition is detected and a control signal generated unlatching the pin to allow it to freely pivot about its supported end. Upon unlatching of the pin lateral reaction forces are created acting on the pin holder which forces are sensed and an error signal generated therefrom, which signal is used to control the positioner device to move the pin and hole relative to each other in a direction so as to align the pin and hole axes and relieve the bound condition so that further advance of the pin into the hole will be accommodated. This latter process is repeated if a further binding is created and so on until the pin is inserted.

2 Claims, 9 Drawing Figures

SYSTEM AND METHOD FOR AUTOMATIC INSERTION OF PINS IN HOLES

BACKGROUND OF THE INVENTION

1. Field of the Invention

This invention is concerned with automated assembly techniques and more specifically a system for automatically inserting a pin into a tightly fitting hole.

2. Description of the Prior Art

A recurring problem in endeavoring to automate various assembly processes is that of inserting pins into tightly fitting holes since alignment of the pin and hole axes by means of the assembly controller with sufficient accuracy such that the insertion can be carried out by means of simply applying an aligned force is extremely difficult.

The several alternate approaches which have been proposed in the prior art have included one in which the pin is controlled and constrained in all six degrees of freedom and by means of complex reactive force feedback sensing and servo systems the pin is guided into the hole (the so-called "force steering" approach). While this approach is theoretically quite possible, the complexity of the required control system and the sensitivity and sophistication of the sensing elements for cases in which the pin and hole axes are tilted with respect to each other when insertion is attempted would result in costly apparatus of less than desirable reliability at the present state of the art.

A second approach described in "Numerically Controlled Automatic Assembling System" a paper T. Sata et al., presented at the General Assembly of CIRP in Stockholm, Aug. 29, 1972 has been to freely support the pin in a cylinder which cylinder allows free rotation and translation of the pin. The pin is then translated along a line transverse to the axis of the hole until a locking condition of the pin and cylinder is sensed caused by an "overshoot" positioning of the pin and hole axes. By means of force feedback techniques, this locking condition in the cylinder is relieved and the process is then carried out along an orthogonal axis in the same plane orthogonal to the hole's axis. While this approach involves a less complex control and sensing system, a repetitive searching process is required which is quite time consuming on the time scales involved in carrying out automated assembly processes.

A variation of this technique described in U.S. Pat. No. 3,824,674 employs an elastic (spring) coupling between the pin holder and the X, Y, Z positioning device, and a control strategy for "finding" the hole. From a starting point some distance from the hole, the pin is brought into a preloaded contact with the workpiece and laterally displaced toward the hole, and as the hole is encountered the elastic coupling causes the pin to tilt in the direction of the leading edge. After the pin partially enters the hole (detected by the relief of vertical or Z axis preload) a nulling of the X, Y tilt is carried out to complete the pin insertion. However, this approach is not capable of inserting a tightly fitting pin into a hole that is tilted, from the vertical axis of the positioning device since in the "correct" insertion position some X, Y tilt would exist due to this misalignment of angle.

Therefore, an object of the present invention is to provide a system for automatic insertion of pins into holes which does not involve an unduly complex sensing and control system, even for situations in which the pin and hole axes are tilted with respect to each other when insertion is attempted, and also does not require an excessive amount of cycle time, and is capable of accommodating angular misalignment of the pin and hole axes.

SUMMARY OF THE INVENTION

This and other objects which will become apparent upon a reading of the following specification and claims is accomplished by a system wherein the pin is alternatively latched with respect to a pin holder carried by a positioning device or is unlatched to be supported for free angular movement about one end held by the pin holders. The pin in the latched condition is positioned in juxtaposed relationship with the hole, the pin and hole axes approximately aligned (while the member with the hole formed therein is fixed), and the positioner advances the pin into engagement with the hole. If the axes are parallel but offset, i.e., are not sufficiently aligned in X and Y for insertion to occur, the lateral reactive forces created by interaction of the chamfers are nulled by relative lateral movement of the pin and hole correcting the offset error. If the pin and hole axes are misaligned in angle, the pin will only partly enter the hole due to creation of a bound or jam condition by contact of the pin with the hole rim and side wall, which contact creates a bending moment on the pin. This condition is sensed and the pin holder is unlatched. In the unlatched condition, the bending moment produces a lateral force on the pin holder which is sensed by the load cell. Corresponding X, Y displacements are applied by the positioner device (similar to the case of X,Y offset error) which translate the pin holder in the direction to relieve the sensed force. Since the pin holder is unlatched, translation of the pivot point thus changes the angular inclination of the pin in the direction which relieves the angular error, permitting further insertion, which process continues until insertion is complete.

DETAILED DESCRIPTION

In the following detailed description certain specific terminology will be utilized for the sake of clarity and a specific embodiment will be described in order to provide a complete understanding of the invention, but it is to be understood that the invention is not so limited and may be practiced in a variety of forms and embodiments.

Figure 1:
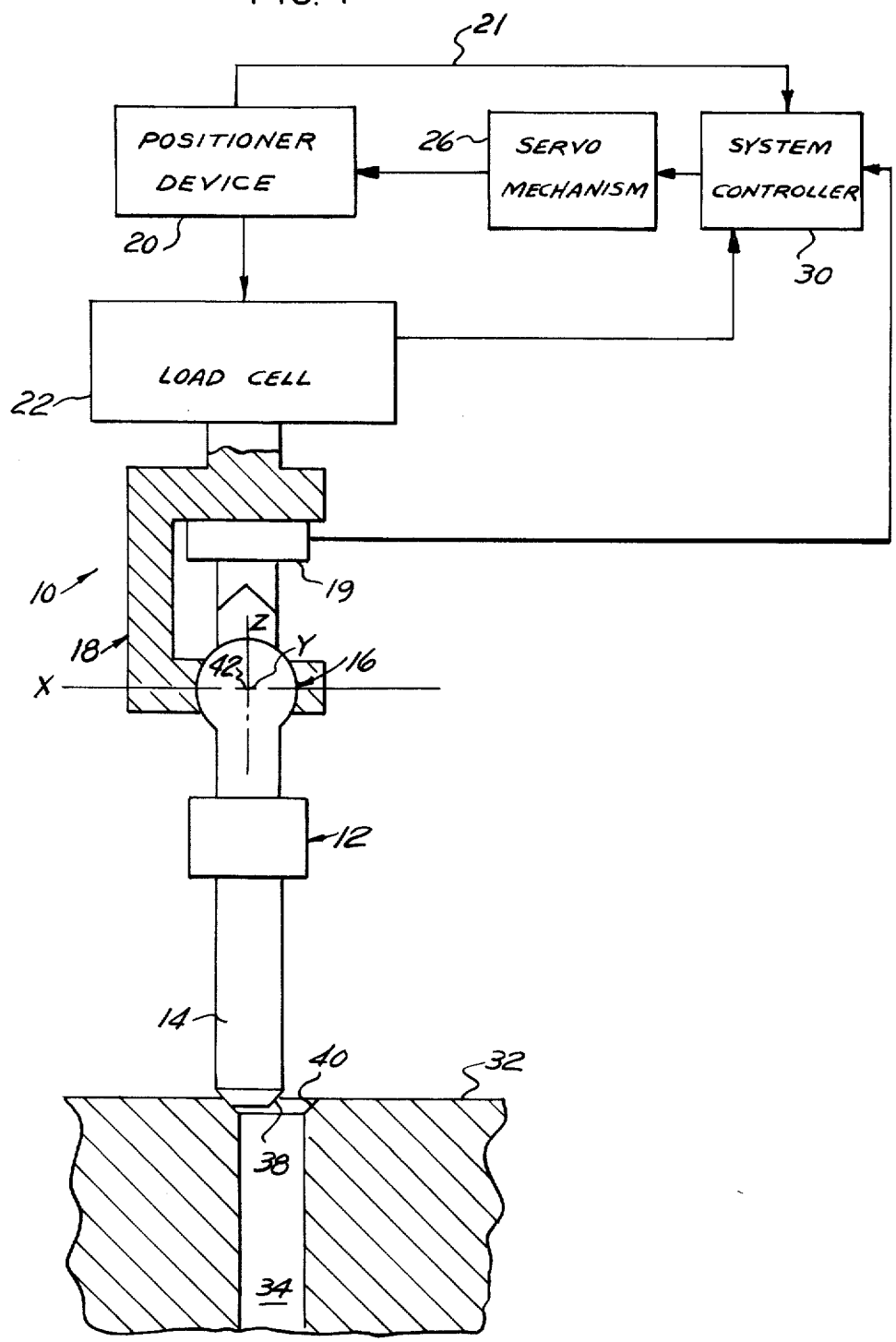
FIG. 1 is a diagrammatic representation of the system according to the present invention.

Referring to the drawings, and particularly FIG. 1, the arrangement according to the present invention is depicted and includes a positioner assembly 10 having a pin holder 12 adapted to support the pin 14 at one end while allowing free angular movement thereof by virtue of a ball socket mounting arrangement 16 carried in a frame 18 whenever a latch means 19 is released but to hold the pin in a fixed orientation whenever the latch means 19 is engaged. Positioner assembly 10 is adapted to be positioned along the X, Y and Z axes by means of a positioner device 20.

The positioner device 20 could be any of a number of well known devices which provide controlled movement in three dimensions while providing feedback information (via loop 21) on the position of the positioner assembly by means of position transducers (not shown). Since the specifics of such devices are well known in the art and do not form a part of the present invention, these details are not here disclosed.

Load cell 22 interposed between the positioner and the frame 18 is provided to generate signals on forces sensed thereby having components along the X, Y, and Z axes. Positioner device 20 is controlled by a servo mechanism 26 which in turn is controlled by commands from a system controller 30 which also reacts to feedback via loop 21 and to the X, Y, and Z axis force and moment signals generated by the load cell 22.

In operation, the positioner device 20, reacting to system controller 30 commands translates the positioner assembly 10 to a predetermined location with the pin 14 above the surface of member 32 held in a fixed position having the mating hole 34 formed therein, to a point at which the pin 14 axis and hole 34 axis are aligned within the tolerance capability of the positioning device 20. This location would typically be a programmed one, that is, the hole 34 will be assumed to be at some determined nominal X-Y location. The assembly 10 is then caused to advance along the Z axis so that the pin 14 descends and enters the hole 34, if the pin 14 and hole 34 are accurately aligned.

If, as would be typical, the pin 14 and hole 34 axes are not laterally aligned but are aligned within the basic capability level of the system (equal to the combined chamfer sizes $C_H$ plus $C_P$), contact of the chamfer surfaces takes place as depicted in FIG. 1. This contact creates a reaction force acting on the pin which is resolved by the load cell 22 into force components along the X, Y and Z axes. By sensing the reaction forces by the load cell 22 in the X-Y plane and nulling them by appropriate relative movement of the pin 14 and member 32 as induced by the positioner device 20, the pin and hole axes may thus be aligned. That is, the reactive force signals constitute a positional error signal for controlling the X, Y positions such that the pin 14 will enter the hole 34.

If the axes are angularly aligned, insertion will then take place by virtue of the Z axis motion created by the positioner device 20 carrying the pin holder assembly 10 along the Z-axis.

Figure 2:
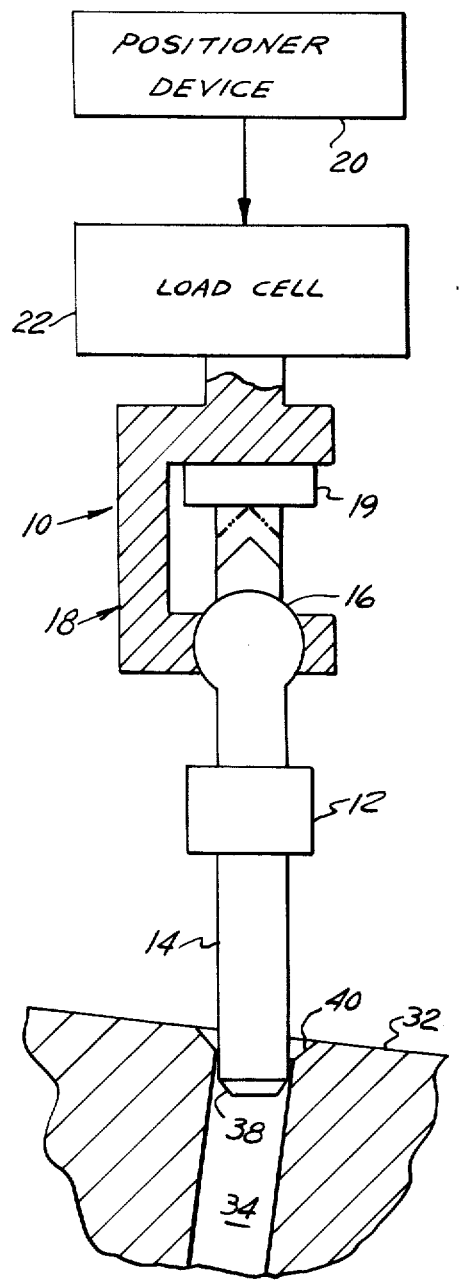
FIG. 2 is a diagrammatic representation of the system shown in FIG. 1 depicting an angularly misaligned pin and hole.
Figure 3:
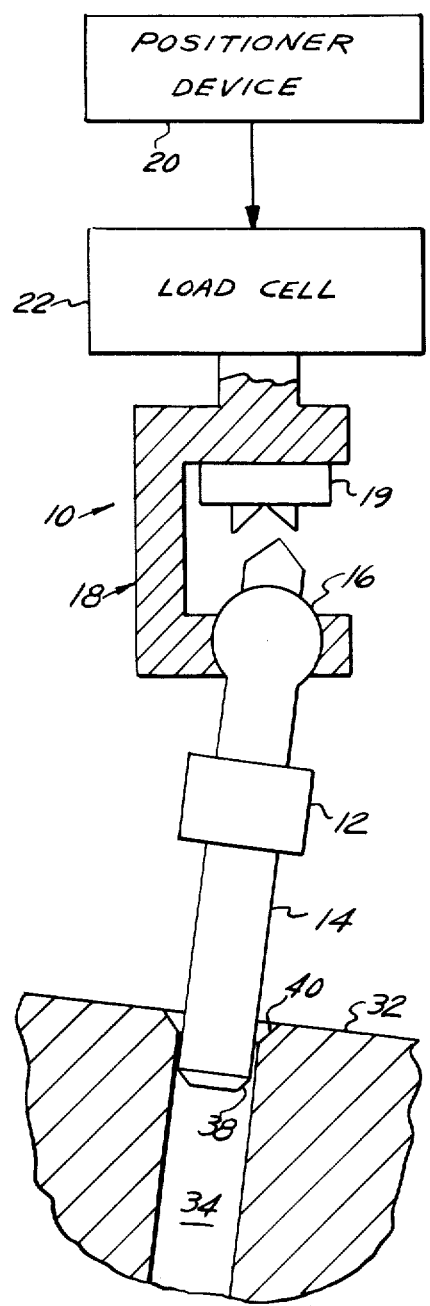
FIG. 3 is a partial diagrammatic representation of the system shown in FIGS. 1 and 2 with the pin and hole axes aligned by the servo mechanism.
Figure 5:
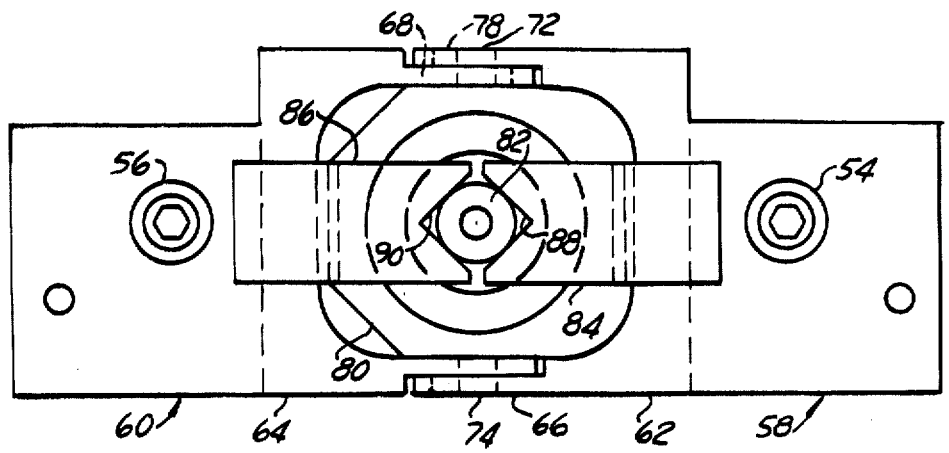
FIG. 5 is a plan view of the pin holder assembly shown in FIG. 2.

If the pin and hole axes are tilted with respect to each other, the pin 14 will enter the hole 34 until a binding or jam condition is created as depicted diagrammatically in FIG. 2. That is, presuming the shaft of the pin is in sliding contact with the rim of the hole, the tip of the pin will encounter the inclined wall of the hole at some depth $\Delta Z \approx c/\tan \theta$, where $c$ is the clearance and $\theta$ is the angular misalignment. In this "binding" condition, interaction of the pin with the inclined hole creates (1) an axial force component at the tip of the pin opposing the insertion force, and (2) a pair of displaced opposing normal forces acting at the two points of contact, producing a bending moment on the pin that cannot be relieved due to the restricted angular freedom. In this condition, nulling movements by the positioner device 20 can eliminate the X, Y reactions by creating counteracting bending moments on the pin 14, but the pin 14 cannot enter the hole 34 due to the axes tilt. This condition may be detected by comparing the Z axis position of the pin 14 with the programmed insertion depth.

At this point, the latch means 19 is released by an appropriate signal from the system controller 30 (as depicted in phantom in FIG. 2). In the unlatched condition, lateral forces are imposed on the socket 16 which is felt by the load cell 22 as forces acting in the X-Y plane, and by relatively moving the pin 14 and the member 32 in the X, Y directions in directions to relieve these reactive forces, while continuing to advance the pin 14 in the Z direction, the pin 14 will ultimately be aligned angularly with the hole 34 so that insertion will be completed.

It can be seen that this approach is quite simple inasmuch as only a simple X, Y nulling control is required and no iterative induced error motions as described above are involved, and accordingly, the objects of the present invention as outlined above have been met.

Figure 4:
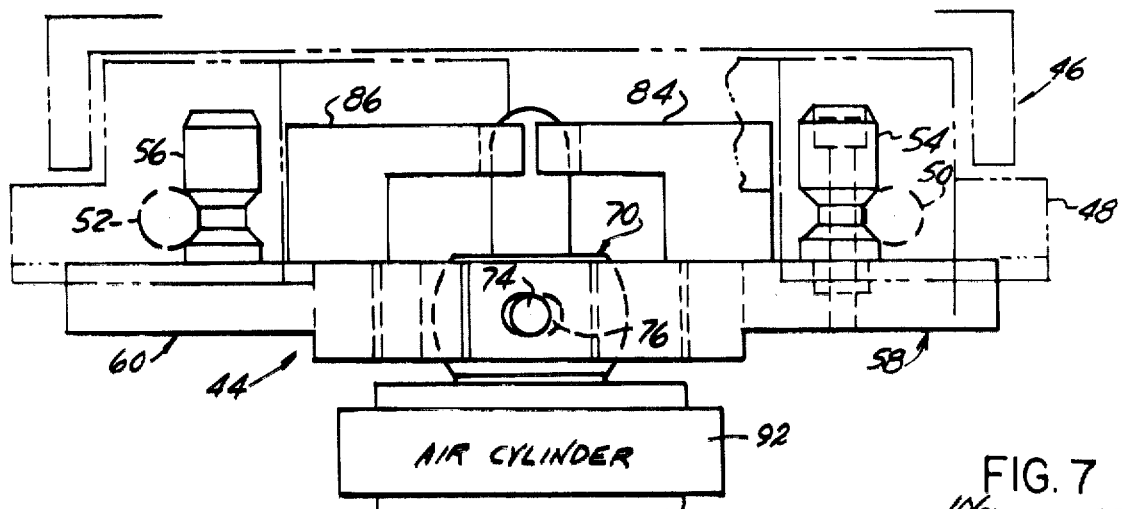
FIG. 4 is a front elevational view of an embodiment of the pin holder assembly.

FIGS. 4-7 depict one example of an actual hardware pin holder such as would be used in an assembly manipulator arm 46 a portion of which is depicted in phantom in FIG. 4. A parallel motion mechanism 48 (also depicted in phantom) is adapted to engage the pin holder mechanism 44 by means of a pair of transverse pins 50, 52 engaging a pair of dowels 54, 56 shown in FIG. 4.

Inasmuch as the mechanical details of such manipulator and parallel motion mechanism are not important to the present invention and in themselves are well known in the art, a detailed description is not here included. Suffice it to say that upon command, the parallel motion mechanism 48 causes reciprocal movement to be induced in one or the other direction via pins 52 and 50.

The pin holder mechanism 44 includes a pair of slidable plates 58 and 60 to which the dowels 54 and 56 are respectively secured. Each slidable plate 58 and 60 includes a bifurcated lower portion 62, which are formed with overlapping complementary portions 66 and 68 respectively. Mounted within the bifurcations 62 and 64 is a spherical bearing 70 supported by means of a pin connection 72, 74 passing through engaging overlapping elongated slots 76 and 78 respectively. These pins 72, 74 support a bearing plate 80 within which a spherical bearing 70 is mounted. Mounted in the upper portion of bearing 70 is a post 82 which extends between a pair of upper plates 84, 86 which are affixed to plates 58 and 60 and formed with V-sections 88 and 90 so as to engage post 82 upon reciprocatory motion thereof induced by the parallel motion mechanism 48. Upon retraction of plates 84 and 86, the post 82 is released allowing free angular motion of the bearing 70 and attached structure to provide the latching function described above. This arrangement also allows rapid movement of the pin holder inducing flopping of the pin 14 due to the angular freedom of movement.

Affixed to the lower portion of the bearing 70 is a pin holding assembly including an air cylinder 92 having an operating member 94 engaging a groove 96 in each of three engagement fingers 98, 100 and 102. Each engagement finger 98, 100, 102 is pivotally mounted at 104 (FIG. 4) so that upon reciprocation of the operating member 98, 100 and 102 rotate the pivot point 104 so as to converge together or diverge apart.

Figure 7:
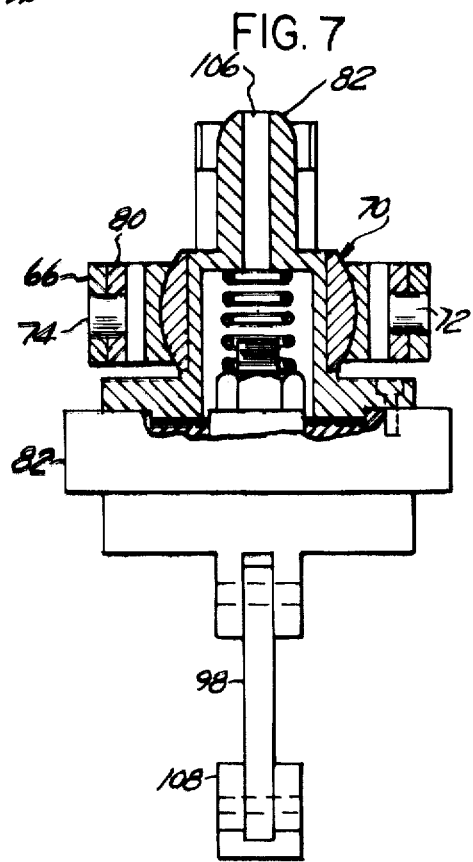
FIG. 7 is a partially sectional view of a portion of the pin holder assembly depicted in FIG. 2.

As shown in FIG. 7, the air cylinder 92 may be supplied with operating fluid via central passage 106 formed in the post 82.

Figure 6:
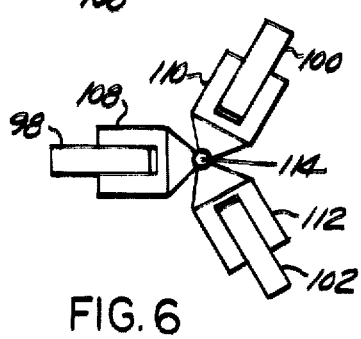
FIG. 6 is a view of the pin holder shown in FIG. 2 taken along the lines 6—6.

Each of the fingers 98, 100 and 102 are provided with gripper surfaces 108, 110 and 112 pinned to each finger respectively 98, 100 and 102. Thus upon a control activation of the air cylinder 92, such as to extend, retract the operating member 94, the fingers 98, 100 and 102 diverge or converge to release or grip pin 114 (FIG. 6). It will be appreciated that a range of pin diameters can be accommodated with this particular gripper arrangement.

Figure 8A:
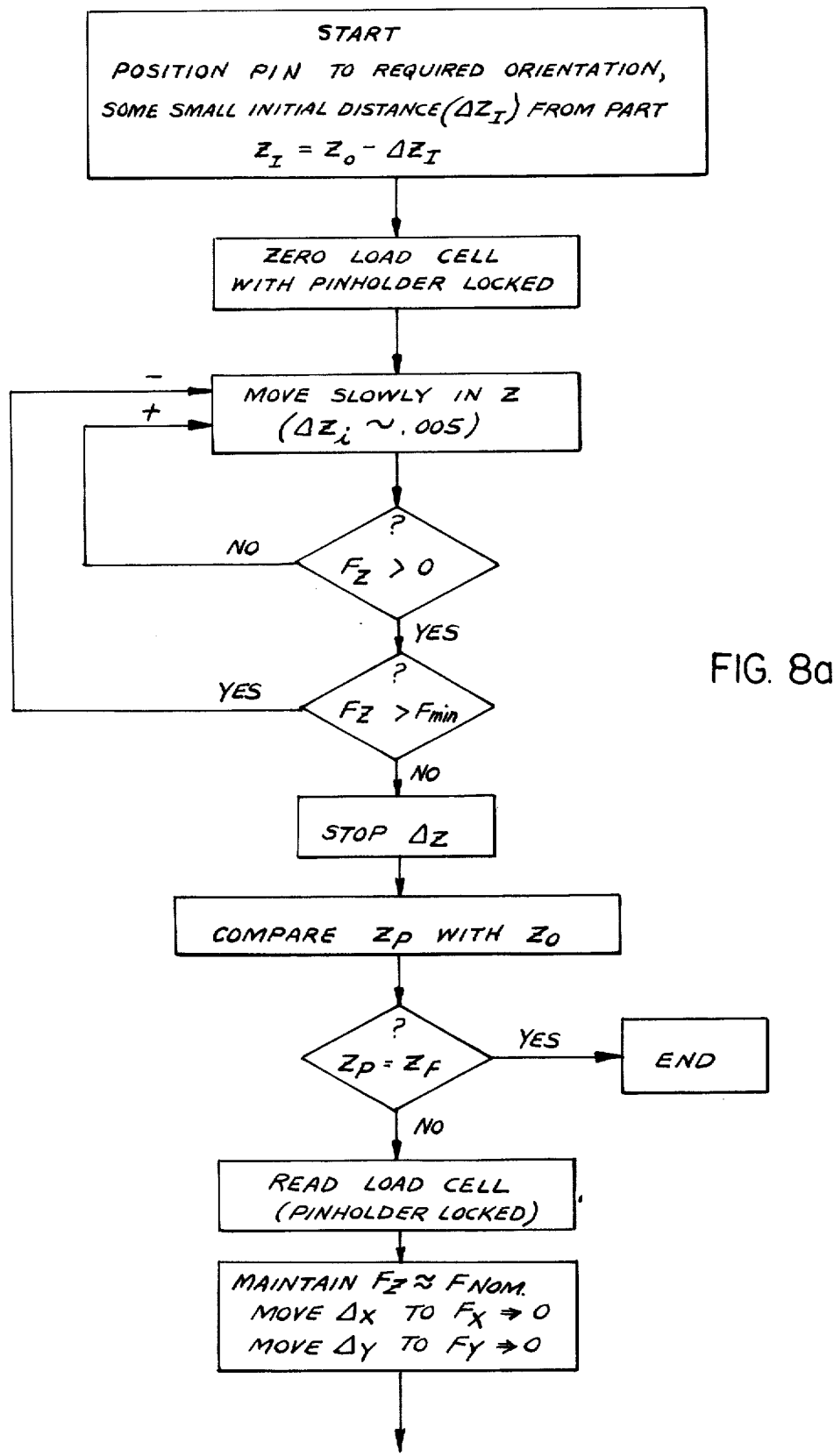
FIGS. 8a and 8b are flow sheets for a control process to implement the present invention.
Figure 8B:
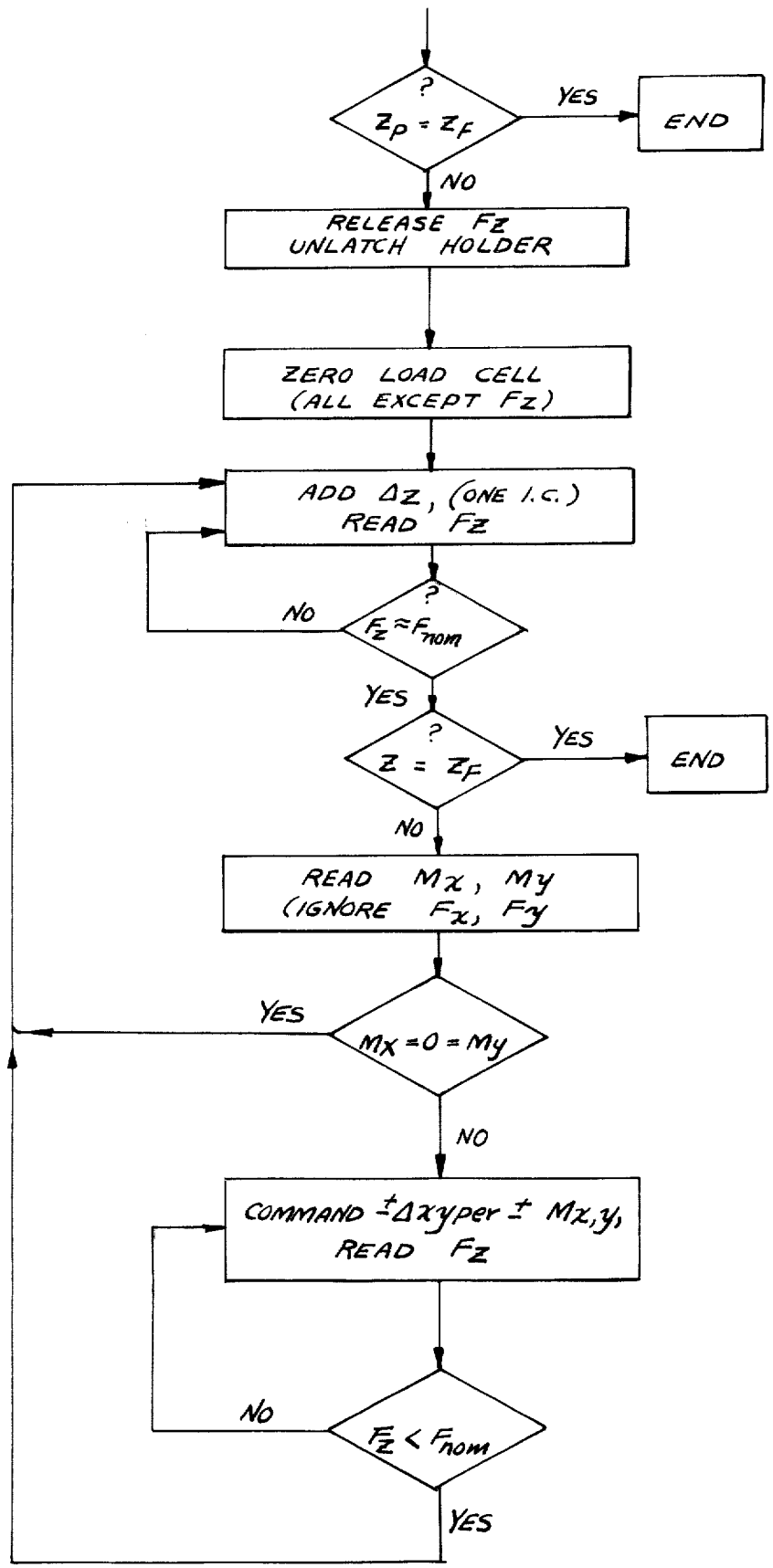

FIGS. 8a and 8b are flow charts depicting in further detail a control scheme for carrying out the method of the present invention, or controlling the above-described system.

To start with, the pin is positioned over the part having the hole formed therein in an orientation with the pin and hole axes aligned by the positioning device, some small initial distance above the hole surface, i.e., $\Delta Z_I$ greater than the combined oversize tolerances of the pin and hole, plus the positional tolerance of the positioning device.

The load cell readings are then zeroed to eliminate the effects of gravity, etc., in the given position.

The pin is then slowly and incrementally advanced in the Z direction (i.e., along the pin axis) until a reaction force $F_Z$ of a predetermined level is created, i.e., $F_Z = F_{Min}$ which is preselected to insure pin contact but not so great as to cause damage to the parts or the positioner device. After obtaining the proper Z axis reaction, the position of the pin along the Z axis is compared with the corresponding Z axis position of the pin in the inserted position to determine if the pin has been inserted, i.e., if $Z_P$ (pin position in the Z-axis) equals $Z_F$ (pin position when inserted).

If not, the load cell readings as to $F_X$ and $F_Y$ (force reactions in the plane normal to the Z axis) are determined, and the position of the pin is shifted ($\alpha X, \alpha Y$) in this plane so as to eliminate these reactive forces, while maintaining pin-chamfer contact ($F_Z = F_{Nom}$) by continuously advancing the pin along the Z axis as the nulling movements in X and Y are taking place.

Referring to FIG. 8b, if after these forces have been reduced to zero, Z equals the insertion depth $Z_F$, the process is complete.

If not, a binding or jam condition exists, as previously described and the latch means is released by a signal from the control system (after releasing $F_Z$) and the load cell readings are rezeroed.

The pin is then again advanced to generate the Z axis reactive force $F_{Nom}$, and the pin position is again checked to determine if the pin has been inserted, i.e., if Z equals $Z_F$.

If not, the bending moments $M_X$ and $M_Y$ being exerted on the load cell are read, and if zero, the Z axis force is increased until these bending moments are produced.

The positioner device is activated to move the pin in the X,Y plane in a direction such as to eliminate these bending moments $M_X$ and $M_Y$ until $F_Z$ declines below $F_{Nom}$, whereupon the pin is again advanced in Z to regenerate the reactive forces and the process is repeated until insertion is completed.

It can be appreciated that this two-stage approach, i.e., with the pin latched and unlatched, reduces a multi-degree of freedom control problem which exists when both the X-Y position and axes tilt error are present, to an essentially two degree of freedom problem. That is, the lateral position positional error is first corrected by movements in X and Y with the pin latched, and the tilt error is then corrected by movements in the X,Y plane with the pin unlatched.

Thus, a relatively simple and rapid system and method of inserting pins in holes has been provided.

In the foregoing detailed description, specific terminology was utilized for the sake of clarity, but in the following appended claims certain broadened terminology is utilized in order to properly claim the present invention. The following lexicography is here included in order to make clear the meaning of these terms and to satisfy the requirements of Rule 75(d) as to proper antecedent basis:

a. means positioning said pin and hole with their axes in approximate alignment such that said chamfer on said at least one of said pin or hole is engaged with the other of said pin or hole: This includes the positioner device 20, the system controller 30, and the holder assembly 10.

b. means releasably holding one of said pin or member in a fixed orientation: This includes the latch means 19 cooperating with the ball socket mounting arrangement 16 and frame 18.

c. means relatively moving said pin and said member along a direction tending to insert said pin in said hole: This includes the positioner device 20, the system controller 30, the holder assembly 10.

d. means sensing the lateral reactive force created by the interaction of said chamfer and the other of said pin or hole under the influence of said axial force: This is the load cell 22.

e. means moving said pin and member laterally relative each other in directions tending to null said sensed reactive force: This includes the positioner device reacting to the load cell 22 signals.

f. means sensing a bending condition imposed on said pin by a jam condition of said pin in said hole due to misalignment of said pin and hole axes: This includes the load cell 22.

g. means releasing said releasable holding means holding said one of said pin or said member so as to allow free angular movement thereof but restraining said pin or member from laterally moving in the absence of such angular movement: This includes the latch means 19 releasing the socket mounting arrangement 16 so that the pin can move angularly in the socket, but restrains any lateral movement of pin 14 by virtue of being carried by the frame 18 without such rotation.

h. means relatively moving said pin and member laterally in response to said sensed bending condition of said pin in a direction to relieve said jam condition until said pin and hole axes are aligned, whereby said pin enters said hole under the influence of said axial force: This includes the system controller 30 and the positioner device 20.

What is claimed is:

1. A system for inserting a pin into a member having a mating hole, at least one of said pin or hole being chamfered, said system comprising:

means positioning said pin and hole with their axes in approximate alignment such that said chamfer on said at least one of said pin or hole is engaged with the other of said pin or hole;

means releasably holding one of said pin or member in a fixed orientation and fixing the position of the other of said pin or member;

means for relatively moving said pin and said member along a direction tending to insert said pin in said hole;

means sensing the lateral reactive force created by the interaction of said chamfer and the other of said pin or hole under the influence of said axial force;

means moving said pin and member laterally relative each other in directions tending to null said sensed reactive force;

means sensing a bending condition imposed on said pin by a jam condition of said pin in said hole due to misalignment of said pin and hole axes;

means releasing said releasable holding means holding said one of said pin or said member so as to allow free angular movement thereof but restraining said pin or member from laterally moving in the absence of such angular movement; and means relatively moving said pin and member laterally in response to said sensed bending condition of said pin in a direction to relieve said jam condition until said pin and hole axes are aligned, whereby said pin enters said hole under the influence of said axial force.

2. A method for inserting a pin into a member having a mating hole, at least one of said pin or hole being chamfered, said method comprising the steps of:

positioning said pin and hole with their axes in approximate alignment such that said chamfer on said at least one of said pin or hole is engaged with the other of said pin or hole;

holding one of said pin or member in a fixed orientation and fixing the position of the other of said pin or member;

relatively moving said pin and said member along a direction tending to insert said pin in said hole;

sensing the lateral reactive force created by the interaction of said chamfer and the other of said pin or hole under the influence of said axial force;

moving said pin and member laterally relative each other in a direction tending to null said sensed reactive force;

releasing said one of said pins or said member so as to allow free angular movement thereof while restraining said pin or member from any lateral movement in the absence of such angular movement;

sensing any bending condition imposed on said pin by a jam condition of said pin in said hole due to misalignment of said pin and hole axes; and relatively moving said pin and member laterally in response to said sensed bending condition of said pin in a direction to relieve said jam condition until said pin and hole axes are aligned, whereby said pin enters said hole under the influence of said axial force.

* * * * *